(12) United States Patent
Liu et al.

(10) Patent No.: US 11,348,583 B2
(45) Date of Patent: May 31, 2022

(54) DATA PROCESSING METHOD AND APPARATUS FOR INTELLIGENT DEVICE, AND STORAGE MEDIUM

(71) Applicant: BAIDU ONLINE NETWORK TECHNOLOGY (BEIJING) CO., LTD., Beijing (CN)

(72) Inventors: Yang Liu, Beijing (CN); Xi Xi, Beijing (CN); Long Quan, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 110 days.

(21) Appl. No.: 16/907,269

(22) Filed: Jun. 21, 2020

(65) Prior Publication Data

US 2021/0097994 A1    Apr. 1, 2021

(30) Foreign Application Priority Data

Sep. 29, 2019    (CN) .......................... 201910935399.5

(51) Int. Cl.
*G10L 15/00*    (2013.01)
*G10L 15/22*    (2006.01)
(Continued)

(52) U.S. Cl.
CPC .............. *G10L 15/22* (2013.01); *G10L 15/08* (2013.01); *G10L 15/30* (2013.01);
(Continued)

(58) Field of Classification Search
CPC combination set(s) only.
See application file for complete search history.

(56) References Cited

U.S. PATENT DOCUMENTS 10,367,540 B1    7/2019    Medapalli et al.
10,900,800 B2 *    1/2021    Herbst .................. B60W 50/14
(Continued)

FOREIGN PATENT DOCUMENTS

| CN | 108833236 A | 11/2018 |
| CN | 109451338 A | 3/2019 |
| CN | 110223691 A | 9/2019 |

OTHER PUBLICATIONS

Japanese Patent Application No. 2020-069790 Office Action dated May 25, 2021, 3 pages.
(Continued)

*Primary Examiner* — Vu B Hang
(74) *Attorney, Agent, or Firm* — Lathrop GPM LLP

(57) ABSTRACT

The present disclosure discloses a data processing method and apparatus for an intelligent device, and a storage medium, which relates to a field of artificial intelligence technologies. The method includes: extracting key voice information from collected user voice information; in a non-wireless fidelity (WiFi) network environment, transmitting the key voice information to a mobile terminal, so that the mobile terminal transmits the key voice information to a server, and receives a processing result fed back by the server after the server processes the key voice information; and obtaining the processing result from the mobile terminal to display the processing result.

17 Claims, 4 Drawing Sheets

(51) Int. Cl.
  *G10L 15/08*  (2006.01)
  *G10L 15/30*  (2013.01)
  *G10L 21/0232*  (2013.01)
  *H04W 88/02*  (2009.01)

(52) U.S. Cl.
  CPC .... *G10L 21/0232* (2013.01); *G10L 2015/088* (2013.01); *G10L 2015/223* (2013.01); *H04W 88/02* (2013.01)

(56) References Cited

U.S. PATENT DOCUMENTS

| | | |
|---|---|---|
| 2018/0184283 A1 | 6/2018 | Singh |
| 2019/0114358 A1* | 4/2019 | Crowley Yuronich ...................... G06F 16/24522 |

OTHER PUBLICATIONS

Japanese Patent Application No. 2020-069790 English translation of Office Action dated May 25, 2021, 3 pages.
Chinese Patent Application No. 201910935399.5 Office Action dated Aug. 17, 2021, 9 pages.
Chinese Patent Application No. 201910935399.5 English translation of Office Action dated Aug. 17, 2021, 12 pages.

\* cited by examiner

DATA PROCESSING METHOD AND APPARATUS FOR INTELLIGENT DEVICE, AND STORAGE MEDIUM

CROSS-REFERENCE TO RELATED APPLICATION

The present application is based upon and claims priority to Chinese Patent Application No. 201910935399.5, filed on Sep. 29, 2019, the entire contents of which are incorporated herein by reference.

FIELD

The present disclosure relates to a field of data processing technologies, specifically, to a field of artificial intelligence technologies, and more particularly, to a data processing method and apparatus for an intelligent device, and a storage medium.

BACKGROUND

With the rapid development of intelligent voice interaction technology, intelligent devices that may perform human-computer interaction have been widely used in people's lives. At present, existing intelligent devices usually use a wireless fidelity (WiFi) network to interact with a server to provide users with intelligent interactive services.

However, in actual use scenarios, the intelligent devices are usually operated in an environment without the WiFi network. At this time, as the intelligent devices cannot establish a network connection with the server, they cannot provide users with intelligent interactive services such as intelligent voice interaction.

SUMMARY

Embodiments of the present disclosure provide a data processing method and apparatus for an intelligent device, and a storage medium. When there is no wireless fidelity (WiFi) network in the surrounding environment, the intelligent device may interact with a server by using the network of a mobile terminal, thereby providing users with intelligent interactive services.

Embodiments of the present disclosure disclose a data processing method for an intelligent device, including: extracting key voice information from collected user voice information; in a non-wireless fidelity (WiFi) network environment, transmitting the key voice information to a mobile terminal, so that the mobile terminal transmits the key voice information to a server, and receives a processing result fed back by the server after the server processes the key voice information; and obtaining the processing result from the mobile terminal to display the processing result.

Embodiments of the present disclosure further provide a data processing apparatus for an intelligent device, and the apparatus may include: one or more processors; a memory storing instructions executable by the one or more processors; in which the one or more processors are configured to: extract key voice information from collected user voice information; in a non-WiFi network environment, transmit the key voice information to a mobile terminal, so that the mobile terminal transmits the key voice information to a server, and receives a processing result fed back by the server after the server processes the key voice information; and obtain the processing result from the mobile terminal to display the processing result.

Embodiments of the present disclosure further disclose a non-transitory computer-readable storage medium having computer instructions stored thereon. When the computer instructions are executed on a computer, the computer is caused to execute a data processing method for an intelligent device. The method includes: extracting key voice information from collected user voice information; in a non-wireless fidelity (WiFi) network environment, transmitting the key voice information to a mobile terminal, so that the mobile terminal transmits the key voice information to a server, and receives a processing result fed back by the server after the server processes the key voice information; and obtaining the processing result from the mobile terminal to display the processing result.

BRIEF DESCRIPTION OF THE DRAWINGS

The accompanying drawings are used for a better understanding of the solution, and do not constitute a limitation on the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

Embodiment 1

Figure 1:
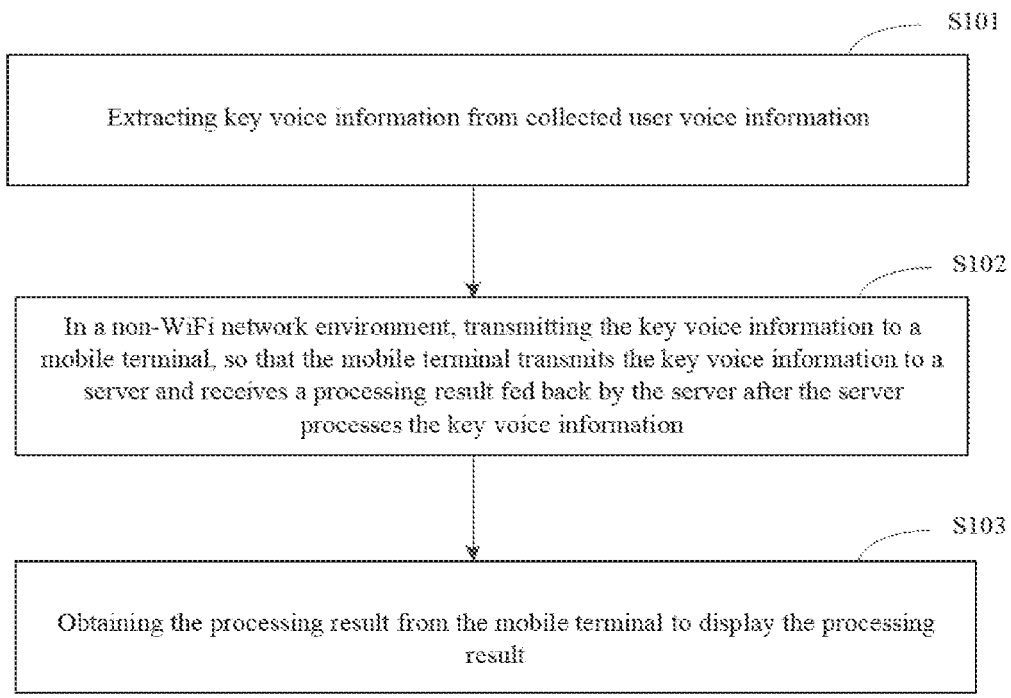
FIG. 1 is a flowchart of a data processing method for an intelligent device according to Embodiment 1 of the present disclosure.

FIG. 1 is a flowchart of a data processing method for an intelligent device according to Embodiment 1 of the present disclosure. This embodiment is applicable to a case where data processing is performed on user voice information during a process in which an intelligent device provides a user with an intelligent interactive service, and is especially applicable to a case where the process of processing the user voice information involves interaction between the intelligent device and a server. The method may be executed by a data processing apparatus for an intelligent device or an intelligent device according to the embodiments of the present disclosure. The apparatus may be implemented in software and/or hardware manner. The intelligent device according to the embodiments of the present disclosure may be any electronic device that may provide intelligent interactive services, such as a smart speaker, a smart TV, a smart watch, and the like. As illustrated in FIG. 1, the data processing method for the intelligent device according to the embodiment may include the following.

At block S101, key voice information is extracted from collected user voice information.

The user voice information may be audio data expressing the user's current requirement in the form of voice or speech when the user needs the intelligent device to provide the intelligent interactive service. The key voice information may be key words or audio data corresponding to key sentences that may indicate the user's current requirement and that are extracted from the user voice information. For example, the intelligent device may be a smart speaker. When the user wants the smart speaker to play a song My Motherland and Me, the user voice information at this time may be audio data corresponding to "turn on the smart speaker to play the song My Motherland and Me". The key voice information extracted from voice data of the user is "play the song My Motherland and Me".

Optionally, the intelligent device in this embodiment is configured with a voice collection device (such as a microphone). The voice collection device may monitor whether there is a sound signal in the environment in real time. If the voice signal exists, the voice collection device acquires the voice signal in the current environment as the user voice information. The voice collection device may also collect the voice signal in the current environment as the user voice information after receiving a voice collection instruction sent by the intelligent device. The voice collection instruction may be triggered by the user through a physical button on the electronic intelligent device, or may be triggered by the user through voice (for example, the user may speak the wake-up word of the intelligent device). Optionally, in order to prevent interference from non-user voices, in this embodiment, voiceprint information of the user to be served may be stored locally on the intelligent device. When collecting the voice signal in the current environment, it is first determined whether the voiceprint information of the voice signal is consistent with the voiceprint information of the user to be served locally stored. If the voiceprint information of the voice signal is consistent with the voiceprint information of the user to be served locally stored, the sound signal in the current environment is collected as the user voice information; otherwise, the user voice information will not be collected.

Optionally, after the user voice information is collected by the intelligent device, there may be unimportant information such as environmental noise, blank voice, or non-required sentences in the collected user voice information. At this time, since the user voice information contains unimportant information, directly sending the collected user voice information to the server for analysis will not only generate a high amount of data transmission, but also interfere with analysis of the user voice information performed by the server. Therefore, to solve this problem, this embodiment may extract the key voice information from the collected user voice information for transmission. There are many specific methods for extracting the key voice information. This embodiment is not limited in this regard.

A first possible implementation may be performing noise reduction processing and/or speech-to-text conversion processing on the collected user voice information to obtain the key voice information.

In detail, the noise reduction processing of the user voice information may be filtering the collected user voice information by using a preset filtering algorithm to filter out interference of noise signals and to improve the purity of the user voice information, such that it is convenient for the server to accurately analyze a voice interaction intention of the user currently in subsequent steps. For example, by performing the noise reduction processing on the user voice information, it is possible to filter out environmental noise in the user voice information, signal interference noise during recording, and blank audio. The speech-to-text conversion processing of the user voice information may be a speech-to-text conversion of the user voice information realized through a speech recognition algorithm or a pre-trained speech recognition model. The speech recognition model may be a neural network model obtained by training an initial neural network model through a large amount of sample data in advance and capable of converting audio data into text data. The sample data may be a large amount of audio data, and text data corresponding to each piece of audio data. The advantage of performing speech-to-text conversion processing on the collected user voice information is that subsequently, the server does not need to perform a text conversion on the voice information, which reduces the power consumption of analysis and processing on the user voice information performed by the server. Since the server needs to provide voice information processing services for a large number of intelligent devices, reducing operations on the speech-to-text conversion of the server may greatly improve the efficiency of processing the voice information by the server, and then improve the efficiency of the intelligent device in providing intelligent interactive services for the user.

A second possible implementation may be recognizing whether there is a word or sentence matching a standard instruction template in the collected user voice information. If there is a word or sentence matching a standard instruction template in the collected user voice information, the matched word or sentence is used as the key voice information. For example, the standard instruction template corresponding to the service of selecting a song may be set to "play a song". If it is detected that there is a sentence matching the standard instruction template in the user voice information "turn on the smart speaker to play the song My Motherland and Me", the sentence "play the song My Motherland and Me" matching the standard instruction template is used as the key voice information.

A third possible implementation may also be intercepting voice information containing the wake-up word from the collected user voice information as the key voice information. The specific execution method of this implementation will be described in detail in subsequent embodiments.

It should be noted that, in this embodiment, at least one of the foregoing possible implementations may be selected to perform the operation of extracting the key voice information from the collected user voice information based on the voice collection triggering mode of the intelligent device, the intelligent interaction mode, and the current environment of the intelligent device. In detail, if the voice collection triggering mode is to detect the voice information of the current user when a voice signal in the environment is detected, the collected voice information may include the wake-up word, and thus the third possible implementation may be adopted to extract the key voice information. If the intelligent interaction mode of the intelligent device is to interact with the intelligent device based on preset standard instructions, the second possible implementation may be used to extract the key voice information. If the environment where the intelligent is currently in is noisy and disruptive, the noise reduction processing in the first possible implementation may be adopted to extract the key voice information. In addition, at least two of the above three possible implementations may be combined to extract the key voice information.

At block S102, in a non-wireless fidelity (WiFi) network environment, the key voice information is transmitted to a mobile terminal, so that the mobile terminal transmits the key voice information to a server and receives a processing result fed back by the server after the server processes the key voice information.

The mobile terminal of the present disclosure may be an electronic device that may still perform information interaction with the server through its own network module in the non-WiFi network environment. For example, the mobile terminal in the present disclosure may be an electronic device with a SIM card installed, so that even in the non-WiFi network environment, the electronic device may also perform information exchange with the server through the internal cellular mobile network (such as 3G/4G network) in the electronic device.

Optionally, in this embodiment, in the non-WiFi network environment, the intelligent terminal may establish a network connection for data transmission with the mobile terminal through the non-WiFi network. Optionally, existing mobile terminals and intelligent terminals are provided with a Bluetooth module, and thus in this embodiment, the intelligent terminal may search for a locally and historically connected mobile terminal from a nearby connectable Bluetooth device when there is no connectable WiFi network in the current environment, and establish a Bluetooth network connection with the mobile terminal. The key voice information extracted at step S101 is transmitted to the mobile terminal based on the Bluetooth network. After receiving the key voice information, the mobile terminal uses its own cellular mobile network to send the key voice information to a server to be interacted in the intelligent terminal. Optionally, the mobile terminal may be installed with an application of the server to be interacted in the intelligent terminal. After receiving the key voice information transmitted by the intelligent device through the Bluetooth network, the mobile terminal transmits, through the application of the server, the key voice information to the server based on the cellular mobile network. After receiving the key voice information, the server analyzes and processes the received key voice information to determine an interaction need of the user, generates corresponding service information as the processing result for the interaction need of the user, and then feeds back the processing result to the mobile terminal (such as the application of the server installed on the mobile terminal). For example, if the key voice information is "play the song My Motherland and Me", the server analyzes key sentence information to determine that the interaction need to the user is "the song My Motherland and Me". And then, the server searches for and downloads the song My Motherland and Me as the processing result, and feeds back the downloaded song "My Motherland and Me" to the mobile terminal.

Optionally, the Bluetooth module usually has several channels that may transmit information. In this embodiment, when the intelligent device needs to send the key voice information to the mobile terminal, a first channel of a local Bluetooth module may be used to control a second channel of the local Bluetooth module to switch from an OFF state to an ON state, and the key voice information is transmitted to the mobile terminal through the second channel. The power consumption of the first channel is lower than that of the second channel, and the first channel is in an normally ON state after the local Bluetooth module is enabled. The channel for transmitting the voice information is usually a channel with high power consumption, and the channel for receiving transmission instructions is usually a channel with low power consumption. In order to reduce the power consumption of the Bluetooth module in the mobile terminal, in this embodiment, the channel with low power consumption in the Bluetooth module may be set as the normally ON channel. The channel with high power consumption is turned on when it is working, and is turned off when it is not working. When the intelligent device needs to send the key voice information to the mobile terminal, the intelligent device may send a voice information transmission instruction to the first channel with low power consumption in the local Bluetooth module. After receiving the voice information transmission instruction, the first channel is used to control the second channel with high power consumption used for transmitting the voice information to switch from the OFF state to the ON state, and thus the intelligent device may transmit the key voice information to the mobile terminal through the second channel. Correspondingly, for the mobile terminal, it is also that when it is detected that the voice information is transmitted via the first channel in the Bluetooth module, the state of the second channel is switched from the OFF state to the ON state. The second channel receives the key voice information transmitted by the intelligent device, and transmits the received key voice information to the application in the server. The application transmits the key voice information to the server based on the cellular mobile network in the mobile device.

It should be noted that in this embodiment, in the non-WiFi network environment, in addition to the above-mentioned network connection established between the Bluetooth network and the mobile terminal, the intelligent device may also use other non-WiFi networks to establish the network connection. For example, the non-WiFi networks may be an mesh network, a ZigBee network, or the like, which are not limited in this embodiment. In addition, after receiving the key voice information, the mobile terminal only needs to transmit the key voice information to the server through the network of the mobile terminal without performing other processing operations on the key voice information, and thus no excessive power of the mobile terminal will be consumed.

At block S103, the processing result is obtained from the mobile terminal to display the processing result.

Optionally, after receiving the processing result fed back by the server, the mobile terminal may use a network connection between the mobile terminal and the intelligent terminal, for example, a Bluetooth network, to forward the processing result fed back by the server to the intelligent device. The specific transmission process is similar to the process in which the intelligent terminal transmits the key voice information to the mobile terminal described in S102, and details will not be described herein.

Optionally, after the intelligent terminal obtains the processing result transmitted by the mobile terminal, the intelligent terminal displays the processing result. In detail, if the processing result includes audio data, the audio data may be played by a voice playing device. If the processing result includes a text or an image, the text or image may be displayed on a display screen. For example, if the processing result received by the intelligent device is the song My Motherland and Me, the intelligent device may play the song requested by the user through a speaker, thereby providing the intelligent interactive service for the user.

With the data processing method for the intelligent device according to the embodiment of the present disclosure, after the key voice information is extracted from the collected user voice information, if the intelligent device is in the non-WiFi network environment, the network connection with the mobile terminal is established. The key voice information extracted is transmitted to the mobile terminal, and then transmitted to the server for processing through the network of the mobile terminal. After the server has processed the key voice information, the processing result is also fed back to the intelligent device for display through the network of the mobile terminal. In this embodiment, before the intelligent device transmits the voice information to the server, the key voice information is extracted locally from the collected user voice information to reduce the amount of voice information to be transmitted, thereby saving the power consumption of the intelligent device, and improving efficiency of subsequent data processing of the server. In addition, when the WiFi network is unavailable in the surrounding environment, the intelligent device interacts with the server by using the network of the mobile terminal to provide the user with intelligent interactive services. Furthermore, such a process does not require the mobile terminal to perform other processing operations on the key voice information to be transmitted, and thus the power consumption of the mobile terminal may be saved to some extent.

Embodiment 2

Figure 2:
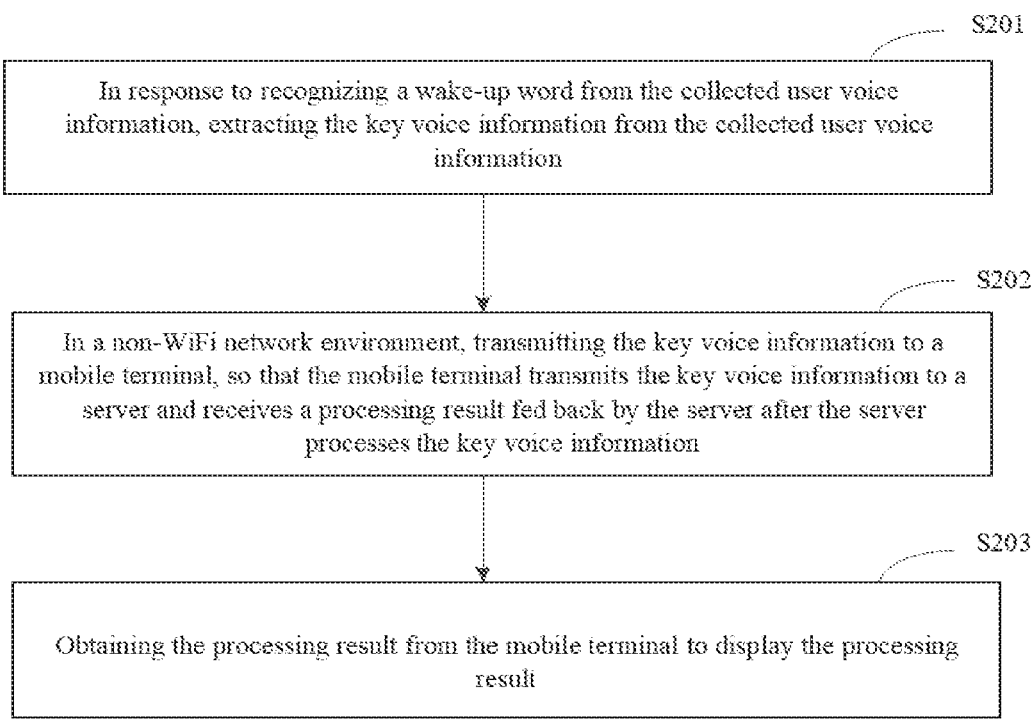
FIG. 2 is another flowchart of a data processing method for an intelligent device according to Embodiment 2 of the present disclosure.

FIG. 2 is another flowchart of a data processing method for an intelligent device according to Embodiment 2 of the present disclosure. This embodiment is further optimized based on the foregoing embodiment, and specifically illustrates how to extract the key voice information from the collected user voice information. In detail, as illustrated in FIG. 2, the data processing method for the intelligent device provided in this embodiment may include the following.

At block S201, in response to recognizing a wake-up word from the collected user voice information, the key voice information is extracted from the collected user voice information.

The wake-up word may be a word, a short sentence or some special sound (such as the sound of a handclap) used to wake up the intelligent device to intelligently interact with the user. The wake-up word may be set by the user and saved in the intelligent device, or may be a system default of the intelligent device. For example, the wake-up word for the smart speaker may be "smart speaker".

When the intelligent device does not need to provide intelligent services for the user, the intelligent device usually enters a low-power sleep state to reduce its power consumption. In such a state, high-power processes or modules in the intelligent device are in an inactive state, and only a few low-power detection modules are in an active state. For example, when the intelligent device is in the sleep state, modules with high power consumption, such as the data processing module, voice playing module, and image display module, in the intelligent device may be stopped from running, and the working state of the voice collection module is retained to enable the voice collection module to collect the collected user voice information, and to detect whether there is the wake-up word in the collected user voice information. If there is the wake-up word, it indicates that the user voice information is a statement spoken by the user that requires turning on the intelligent device to provide intelligent interactive services for the user. The intelligent device may extract the key voice information from the user voice information. If there is no wake-up word, it indicates that the user voice information may be chatting of surrounding users or surrounding environmental sounds (such as a sound from a TV), and thus there is no need to extract the key voice information.

Optionally, in this embodiment, since the user voice information includes the wake-up word, when the key voice information is extracted from the collected user voice information according to this embodiment, the voice information containing a wake-up word may be intercepted from the collected user voice information and used as the key voice information. In detail, the wake-up word may be recognized from the collected user voice information. The time when the wake-up word appears is used as the start time for intercepting, the time when the user voice information ends is used as the end time for intercepting, and the voice information from the start time to the end time is extracted from the user voice information as the key voice information. Optionally, in order to reduce interference information in the key voice information, this embodiment may also perform the noise reduction processing on the intercepted voice information after intercepting the voice information from the start time to the end time from the user voice information to obtain final key voice information. Optionally, in order to reduce the power consumed by the server on analyzing and processing the user voice information, and to improve the efficiency of the intelligent device to provide intelligent interactive services for the user, this embodiment may also perform the text conversion operation on the voice information after the noise reduction processing. The text information obtained after the text conversion operation is used as the final key voice information.

At block S202, in a non-WiFi network environment, the key voice information is transmitted to a mobile terminal, so that the mobile terminal transmits the key voice information to a server, and receives a processing result fed back by the server after the server processes the key voice information.

At block 203, the processing result is obtained from the mobile terminal to display the processing result.

With the data processing method for the intelligent device according to the embodiment of the present disclosure, after the intelligent device collects the user voice information, the intelligent device only performs keyword extraction on the user voice information containing the wake-up word, which prevents the intelligent device from incorrectly providing intelligent interactive services due to an incorrect extraction of the key voice information from non-interactive voice information in the environment, and also greatly saves the power consumption of the intelligent device. When extracting key information from the user voice information, the voice information containing a wake-up word is intercepted and used as the key voice information, so as to realize rapid and accurate extraction of the key information from the user voice information. When the WiFi network is unavailable in the surrounding environment, the intelligent device interacts with the server by using the network of the mobile terminal, thereby ensuring that the intelligent device may normally provide intelligent interactive services for the user regardless of an absence of the WiFi network.

Embodiment 3

Figure 3A:
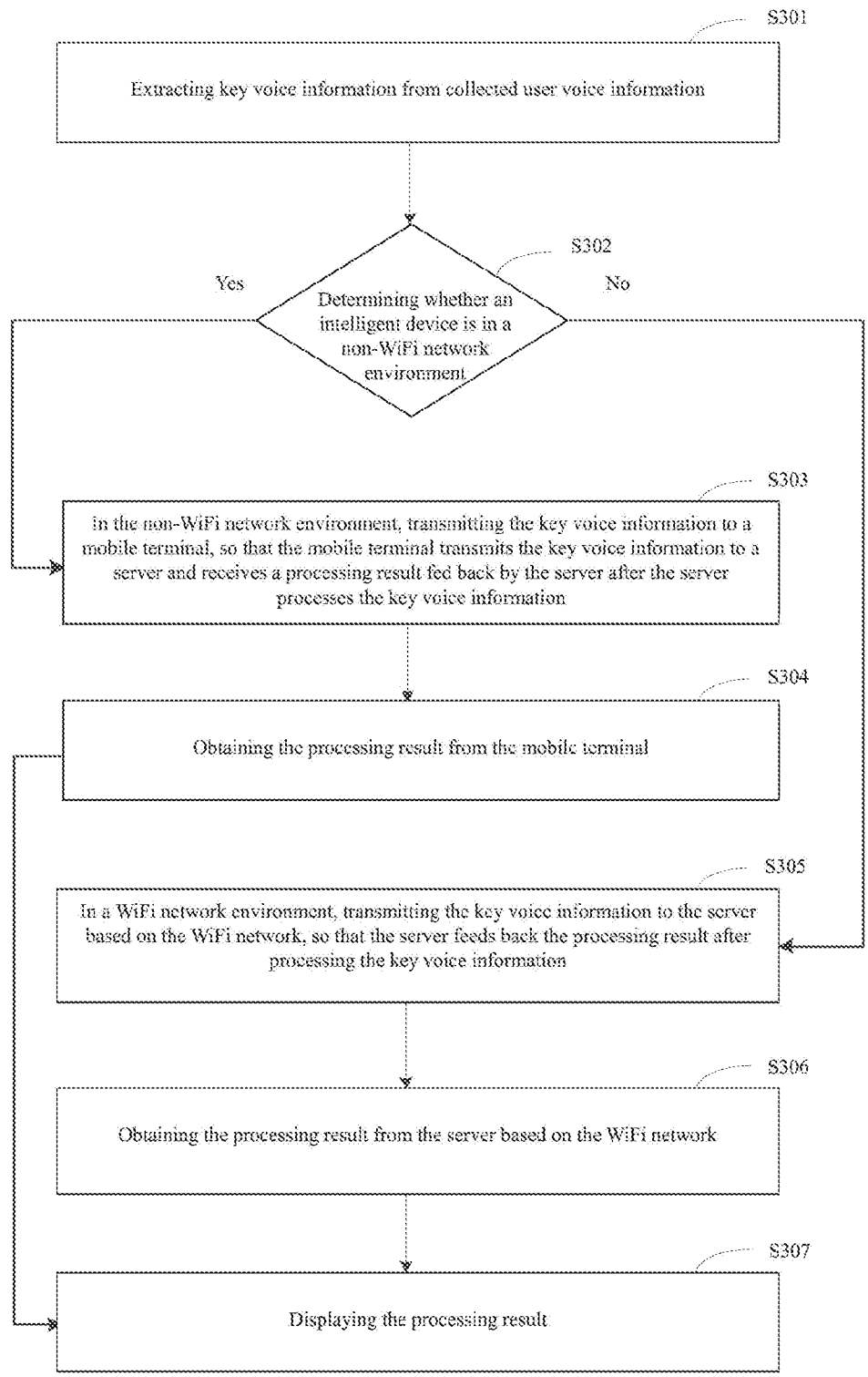
FIG. 3A is yet another flowchart of a data processing method for an intelligent device according to Embodiment 3 of the present disclosure.
Figure 3B:
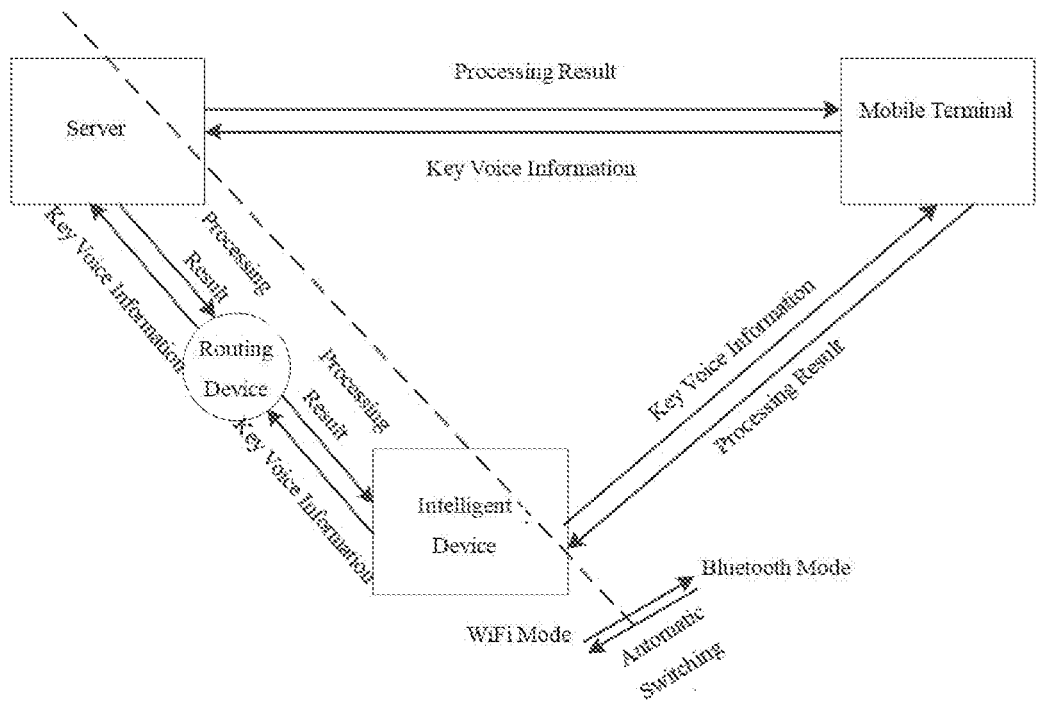
FIG. 3B is a schematic diagram of a data processing process of an intelligent device according to the third embodiment of the present disclosure.

FIG. 3A is a flowchart of a data processing method for an intelligent device according to Embodiment 3 of the present disclosure. FIG. 3B is a schematic diagram of a data processing process of an intelligent device according to the Embodiment 3 of the present disclosure. This embodiment is further optimized based on the foregoing embodiments, and provides an embodiment of the data processing method when the intelligent device is in a different network environment. In detail, as illustrated in FIGS. 3A-3B, the data processing method for the intelligent device according to this embodiment may include the following.

At block S301, key voice information is extracted from collected user voice information.

At block S302, it is determined whether the intelligent device is in a non-WiFi network environment. If yes, the step S303 is executed; if not, the step S305 is executed.

Optionally, as illustrated in FIG. 3B, the intelligent device in this embodiment has two networking methods. One networking method is that when the environment is an available WiFi network environment, the intelligent device may be switched to the WiFi mode at this time, and connects to the WiFi network in the environment through a routing device. Consequently, data interaction may be performed with the server through the WiFi network. Another networking method is that when the environment is an unavailable WiFi network environment, the intelligent device may switch to Bluetooth mode and establish a Bluetooth network connection with the mobile terminal through the Bluetooth module. The Bluetooth network may only perform a data transmission operation.

Optionally, after the intelligent device extracts the key voice information from the collected user voice information, the intelligent device needs to transmit the key voice information to the server. Consequently, it is necessary to check whether the current environment where the intelligent device is in is the non-WiFi network environment. If yes, the operations of S303-S304 are performed to complete the interaction process with the server; and if not, the operations of S305-S306 are performed to complete the interaction process with the server.

At block S303, in a non-wireless fidelity (WiFi) network environment, the key voice information is transmitted to a mobile terminal, so that the mobile terminal transmits the key voice information to a server, and receives a processing result fed back by the server after the server processes the key voice information.

Exemplarily, when the intelligent device is in the non-WiFi network environment, the intelligent device automatically switches to the Bluetooth mode, and the corresponding networking method is to establish a Bluetooth network connection with the mobile terminal. The intelligent device may transmit the key voice information to the mobile terminal through the Bluetooth network. After receiving the key voice information transmitted by the intelligent device, the mobile terminal uses its local cellular mobile network to forward the key voice information to the server. After receiving the key voice information sent by the mobile terminal, the server analyzes and processes the key voice information, and sends the processing result to the mobile terminal. The mobile terminal, after receiving the processing result fed back by the server through the cellular mobile network, uses the Bluetooth network to forward the processing result to the intelligent device.

At block S304, the processing result is obtained from the mobile terminal.

Exemplarily, the intelligent device receives the processing result transmitted by the mobile terminal through the Bluetooth network.

At block S305, in a WiFi network environment, the key voice information is transmitted to the server based on the WiFi network, so that the server feeds back a processing result after processing the key voice information.

Exemplarily, when the intelligent device is in the WiFi network environment, the intelligent device automatically switches to the WiFi mode. The corresponding networking method is to connect to the WiFi network through the routing device. The intelligent device may directly use the WiFi network to send the key voice information to the server. After receiving the key voice information sent by the intelligent device, the server analyzes and processes the key voice information.

At block S306, the processing result is obtained from the server based on the WiFi network.

Exemplarily, when the intelligent device is in the WiFi network environment, the intelligent device may directly interact with the server through the WiFi network, such that when the server feeds back the processing result to the intelligent device, the intelligent device may use the WiFi network to receive the processing result fed back by the server.

At block S307, the processing result is displayed.

With the data processing for the intelligent device according to the embodiment of the present disclosure, after the intelligent device extracts the key voice information from the collected user voice information, if the intelligent device is in the WiFi network environment, the intelligent device may directly send the key voice information to the server based on the WiFi network, and receive the processing results of the key voice information fed back by the server to provide the user with intelligent interactive services. If the intelligent device is in the non-WiFi network environment, the key voice information may be transmitted to the server through the forwarding of the mobile terminal network to obtain the processing result fed back by the server, thereby providing the user with intelligent interactive services. In this embodiment, the intelligent device may, based on whether there is a WiFi network in its environment, automatically adapt to the network through which to interact with the server, thereby achieving voice interaction with the user.

Embodiment 4

Figure 4:
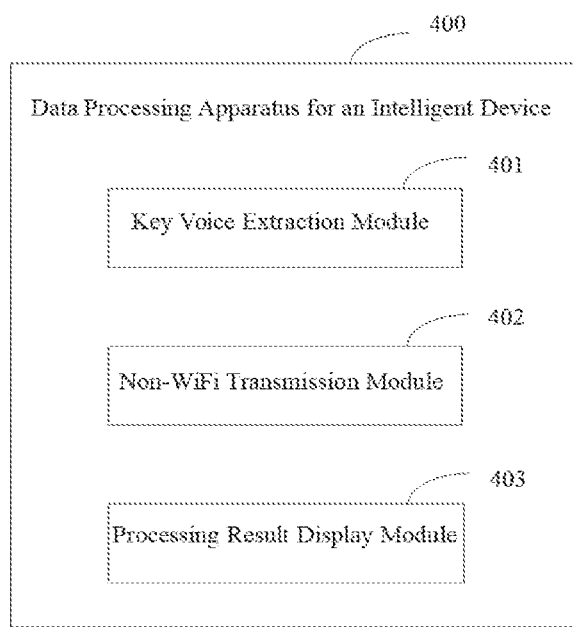
FIG. 4 is a block diagram of a data processing apparatus for an intelligent device according to a fourth embodiment of the present disclosure.

FIG. 4 is a schematic diagram of a data processing apparatus for an intelligent device according to Embodiment 4 of the present disclosure. The apparatus may execute the data processing method for the intelligent device according to any embodiment of the present disclosure, and has corresponding functional modules and beneficial effects for executing the method. Optionally, the apparatus may be implemented in software and/or hardware, and may be integrated in the intelligent device. As illustrated in FIG. 4, the data processing apparatus 400 for the intelligent device may include a key voice extraction module 401, a non-WiFi transmission module 402, and a processing result display module 403.

The key voice extraction module 401 is configured to extract key voice information from collected user voice information.

The non-WiFi transmission module 402 is configured to, in a non-WiFi network environment, transmit the key voice information to a mobile terminal, so that the mobile terminal transmits the key voice information to a server, and receives a processing result fed back by the server after the server processes the key voice information.

The processing result display module 403 is configured to obtain the processing result from the mobile terminal to display the processing result.

With the data processing apparatus for the intelligent device according to the embodiment of the present disclosure, after the key voice information is extracted from the collected user voice information, if the intelligent device is in the non-WiFi network environment, a network connection with the mobile terminal is established. The key voice information extracted is transmitted to the mobile terminal, and then transmitted to the server for processing through the network of the mobile terminal. After the server has processed the key voice information, the processing result is also fed back to the intelligent device for display through the network of the mobile terminal. In this embodiment, before the intelligent device transmits the voice information to the server, the key voice information is extracted locally from the collected user voice information to reduce the amount of voice information to be transmitted, thereby saving the power consumption of the intelligent device, and improving efficiency of subsequent data processing of the server. In addition, when the WiFi network is unavailable in the surrounding environment, the intelligent device interacts with the server by using the network of the mobile terminal to provide the user with intelligent interactive services. Furthermore, such a process does not require the mobile terminal to perform other processing operations on the key voice information to be transmitted, and thus the power consumption of the mobile terminal may be saved to some extent.

Furthermore, the key voice extraction module 401 is specifically configured to, in response to recognizing a wake-up word from the collected user voice information, extract the key voice information from the collected user voice information.

Furthermore, when extracting the key voice information from the collected user voice information, the key voice extraction module 401 is specifically configured to intercept voice information containing a wake-up word from the collected user voice information as the key voice information.

Furthermore, the key voice extraction module 401 is specifically configured to perform noise reduction processing and/or speech-to-text conversion processing on the collected user voice information to obtain the key voice information.

Furthermore, the non-WiFi transmission module 402 is specifically configured to control, using a first channel of a local Bluetooth module, a second channel of the local Bluetooth module to switch from an OFF state to an ON state, and to transmit the key voice information to the mobile terminal through the second channel. Power consumption of the first channel is lower than that of the second channel, and the first channel is in a normally ON state after the local Bluetooth module is enabled.

Furthermore, the apparatus further includes a WiFi transmission module.

The WiFi transmission module is configured to transmit the key voice information to the server based on the WiFi network, so that the server feeds back a processing result after processing the key voice information.

The processing result display module 403 is configured to obtain the processing result from the server based on the WiFi network to display the processing result.

Embodiment 5

According to the embodiment of the present disclosure, the present disclosure further provides an electronic device and a readable storage medium.

Figure 5:
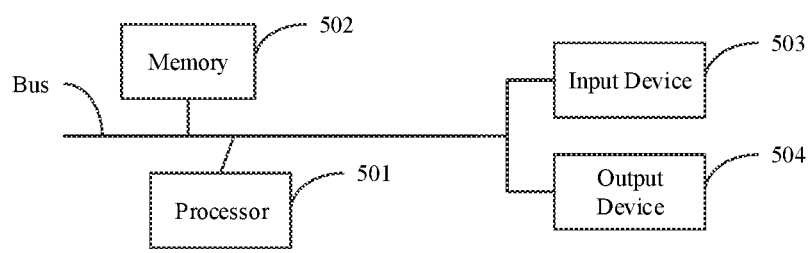
FIG. 5 is a block diagram of an electronic device for implementing a data processing method for an intelligent device according to an embodiment of the present disclosure.

FIG. 5 is a block diagram of an electronic device for implementing a data processing method for an intelligent device according to an embodiment of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 5, the electronic device includes: one or more processors 501, a memory 502, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 501 is taken as an example in FIG. 5.

The memory 502 is a non-transitory computer-readable storage medium according to the embodiments of the present disclosure. The memory stores instructions executable by at least one processor, so that the at least one processor executes the data processing method for the intelligent device according to the embodiments of the present disclosure. The non-transitory computer-readable storage medium according to the present disclosure stores computer instructions, which are configured to make the computer execute the data processing method for the intelligent device according to the embodiments of the present disclosure.

As a non-transitory computer-readable storage medium, the memory 502 may be configured to store non-transitory software programs, non-transitory computer executable programs and modules, such as program instructions/modules (for example, the key voice extraction module 401, the non-WiFi transmission module 402, and the processing result display module 403 shown in FIG. 4) corresponding to the data processing method for the intelligent device according to the embodiment of the present disclosure. The processor 501 executes various functional applications and performs data processing of the server by running non-transitory software programs, instructions and modules stored in the memory 502. That is, the data processing method for the intelligent device according to the foregoing method embodiments is implemented.

The memory 502 may include a storage program area and a storage data area, where the storage program area may store an operating system and applications required for at least one function; and the storage data area may store data created according to the use of the electronic device that implements the data processing method for the intelligent device according to the embodiments of the present disclosure, and the like. In addition, the memory 502 may include a high-speed random access memory, and may further include a non-transitory memory, such as at least one magnetic disk memory, a flash memory device, or other non-transitory solid-state memories. In some embodiments, the memory 502 may optionally include memories remotely disposed with respect to the processor 501, and these remote memories may be connected to the electronic device, which is configured to implement the data processing method for the intelligent device according to the embodiments of the present disclosure, through a network. Examples of the network include, but are not limited to, the Internet, an intranet, a local area network, a mobile communication network, and combinations thereof.

The electronic device configured to implement the data processing method for the intelligent device according to the embodiments of the present disclosure may further include an input device 503 and an output device 504. The processor 501, the memory 502, the input device 503 and the output device 504 may be connected through a bus or in other manners. FIG. 5 is illustrated by establishing the connection through a bus.

The input device 503 may receive input numeric or character information, and generate key signal inputs related to user settings and function control of the electronic device configured to implement the data processing method for the intelligent device according to the embodiments of the present disclosure, such as a touch screen, a keypad, a mouse, a trackpad, a touchpad, a pointing stick, one or more mouse buttons, trackballs, joysticks and other input devices. The output device 504 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

With the technical solution according to embodiments of the present disclosure, after the key voice information is extracted from the collected user voice information, if the intelligent device is in the non-WiFi network environment, a network connection with the mobile terminal is established. The key voice information extracted is transmitted to the mobile terminal, and then transmitted to the server for processing through the network of the mobile terminal. After the server has processed the key voice information, the processing result is also fed back to the intelligent device for display through the network of the mobile terminal. In this embodiment, before the intelligent device transmits the voice information to the server, the key voice information is extracted locally from the collected user voice information to reduce the amount of voice information to be transmitted, thereby saving the power consumption of the intelligent device, and improving efficiency of subsequent data processing of the server. In addition, when the WiFi network is unavailable in the surrounding environment, the intelligent device interacts with the server by using the network of the mobile terminal to provide the user with intelligent interactive services. Furthermore, such a process does not require the mobile terminal to perform other processing operations on the key voice information to be transmitted, and thus the power consumption of the mobile terminal may be saved to some extent.

It should be understood that various forms of processes shown above may be reordered, added or deleted. For example, the blocks described in the present disclosure may be executed in parallel, sequentially, or in different orders.

As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A data processing method for an intelligent device, comprising:
    extracting key voice information from collected user voice information;
    in a non-WiFi network environment, transmitting the key voice information to a mobile terminal, so that the mobile terminal transmits the key voice information to a server and receives a processing result fed back by the server after the server processes the key voice information; and
    obtaining the processing result from the mobile terminal to display the processing result,
    wherein transmitting the key voice information to the mobile terminal comprises:
    controlling, using a first channel of a local Bluetooth module, a second channel of the local Bluetooth module to switch from an OFF state to an ON state; and
    transmitting the key voice information to the mobile terminal via the second channel;
    wherein power consumption of the first channel is lower than that of the second channel, and the first channel is in a normally ON state after the local Bluetooth module is enabled.

2. The method of claim 1, wherein extracting the key voice information from the collected user voice information comprises:
    in response to recognizing a wake-up word from the collected user voice information, extracting the key voice information from the collected user voice information.

3. The method of claim 1, wherein extracting the key voice information from the collected user voice information comprises:
    intercepting voice information containing a wake-up word from the collected user voice information as the key voice information.

4. The method of claim 2, wherein extracting the key voice information from the collected user voice information comprises:
    intercepting voice information containing the wake-up word from the collected user voice information as the key voice information.

5. The method of claim 1, wherein extracting the key voice information from the collected user voice information comprises:
    performing at least one of noise reduction processing and speech-to-text conversion processing on the collected user voice information to obtain the key voice information.

6. The method of claim 1, after extracting the key voice information from the collected user voice information, further comprising:
    in a WiFi network environment, transmitting the key voice information to the server based on the WiFi network, so that the server feeds back the processing result after processing the key voice information; and
    obtaining the processing result from the server based on the WiFi network to display the processing result.

7. A data processing apparatus for an intelligent device, comprising:
    one or more processors;
    a memory storing instructions executable by the one or more processors;
    wherein the one or more processors are configured to:
    extract key voice information from collected user voice information;
    in a non-WiFi network environment, transmit the key voice information to a mobile terminal, so that the mobile terminal transmits the key voice information to a server and receives a processing result fed back by the server after the server processes the key voice information; and
    obtain the processing result from the mobile terminal to display the processing result,
    wherein the one or more processors are configured to:
    control, using a first channel of a local Bluetooth module, a second channel of the local Bluetooth module to switch from an OFF state to an ON state; and
    transmit the key voice information to the mobile terminal via the second channel;
    wherein power consumption of the first channel is lower than that of the second channel, and the first channel is in a normally ON state after the local Bluetooth module is enabled.

8. The apparatus of claim 7, wherein the one or more processors are configured to:
    in response to recognizing a wake-up word from the collected user voice information, extract the key voice information from the collected user voice information.

9. The apparatus of claim 7, wherein the one or more processors are configured to:
    intercept voice information containing a wake-up word from the collected user voice information as the key voice information.

10. The apparatus of claim 8, wherein the one or more processors are configured to:
    intercept voice information containing the wake-up word from the collected user voice information as the key voice information.

11. The apparatus of claim 7, wherein the one or more processors are configured to:
    perform at least one of noise reduction processing and speech-to-text conversion processing on the collected user voice information to obtain the key voice information.

12. The apparatus of claim 7, after the key voice information is extracted from the collected user voice information, the one or more processors are configured to:
    in a WiFi network environment, transmit the key voice information to the server based on the WiFi network, so that the server feeds back the processing result after processing the key voice information; and
    obtain the processing result from the server based on the WiFi network to display the processing result.

13. A non-transitory computer-readable storage medium having computer instructions stored thereon, wherein when the computer instructions are executed on a computer, the computer is caused to execute a data processing method for an intelligent device, and the method comprises:
    extracting key voice information from collected user voice information;

in a non-WiFi network environment, transmitting the key voice information to a mobile terminal, so that the mobile terminal transmits the key voice information to a server and receives a processing result fed back by the server after the server processes the key voice information; and obtaining the processing result from the mobile terminal to display the processing result, wherein transmitting the key voice information to the mobile terminal comprises:

controlling, using a first channel of a local Bluetooth module, a second channel of the local Bluetooth module to switch from an OFF state to an ON state; and transmitting the key voice information to the mobile terminal via the second channel;

wherein power consumption of the first channel is lower than that of the second channel, and the first channel is in a normally ON state after the local Bluetooth module is enabled.

14. The non-transitory computer-readable storage medium of claim 13, wherein extracting the key voice information from the collected user voice information comprises:

in response to recognizing a wake-up word from the collected user voice information, extracting the key voice information from the collected user voice information.

15. The non-transitory computer-readable storage medium of claim 13, wherein extracting the key voice information from the collected user voice information comprises:

intercepting voice information containing a wake-up word from the collected user voice information as the key voice information.

16. The non-transitory computer-readable storage medium of claim 13, wherein extracting the key voice information from the collected user voice information comprises:

performing at least one of noise reduction processing and speech-to-text conversion processing on the collected user voice information to obtain the key voice information.

17. The non-transitory computer-readable storage medium of claim 13, after extracting the key voice information from the collected user voice information, further comprising:

in a WiFi network environment, transmitting the key voice information to the server based on the WiFi network, so that the server feeds back the processing result after processing the key voice information; and obtaining the processing result from the server based on the WiFi network to display the processing result.

* * * * *